United States Patent
Albanesi

(10) Patent No.: US 7,141,001 B1
(45) Date of Patent: Nov. 28, 2006

(54) LOAD-VARIABLE ENGINE CONTROL SYSTEM

(76) Inventor: Daniel Albanesi, P.O. Box 293, Columbus, NJ (US) 08022

( * ) Notice: Subject to any disclaimer, the term of this patent is extended or adjusted under 35 U.S.C. 154(b) by 262 days.

(21) Appl. No.: 10/984,102

(22) Filed: Nov. 9, 2004

(51) Int. Cl.
*B60W 10/04* (2006.01)

(52) U.S. Cl. ..................................... 477/107; 701/104

(58) Field of Classification Search ............... 477/107; 701/103, 104
See application file for complete search history.

(56) References Cited

U.S. PATENT DOCUMENTS

| | | | |
|---|---|---|---|
| 4,582,141 A | | 4/1986 | Van Der Lely |
| 4,720,793 A | * | 1/1988 | Watanabe et al. ............. 701/54 |
| 5,094,206 A | * | 3/1992 | Buslepp et al. ............. 123/325 |
| 5,257,193 A | | 10/1993 | Kusaka et al. |
| 5,323,746 A | * | 6/1994 | Best et al. .................. 123/357 |
| 5,479,345 A | * | 12/1995 | Amsallen ..................... 701/59 |
| 5,517,410 A | | 5/1996 | Nakagawa et al. |
| 5,822,224 A | | 10/1998 | Nakanishi et al. |
| 6,092,032 A | | 7/2000 | Hirayama |
| 6,135,918 A | | 10/2000 | Bellinger et al. |
| 6,957,139 B1 | * | 10/2005 | Bellinger .................... 701/104 |

FOREIGN PATENT DOCUMENTS

WO    WO 01 61172    8/2004

* cited by examiner

*Primary Examiner*—Ha Ho
(74) *Attorney, Agent, or Firm*—Elman Technology Law, P.C.; Gerry J. Elman

(57) ABSTRACT

A method and system for improving fuel economy in a vehicle. The vehicle is equipped with an internal combustion engine, and a suspension air-spring automatic pneumatic control system. The internal combustion engine is controlled by an electronic engine control module. A load signal representative of the cargo load is generated and fed to the engine control module to cause the engine control module to enter a reduced horsepower mode of operation when the vehicle is less than fully loaded. Alternatively, the load signal is used as a basis for attenuating a fuel demand signal generated by the accelerator pedal deflection when the driver presses the accelerator pedal. The attenuated fuel demand signal is input to the engine control module, causing the engine control module to reduce the fuel consumed by the engine when the vehicle is less than fully loaded.

14 Claims, 7 Drawing Sheets

LOAD-VARIABLE ENGINE CONTROL SYSTEM

FIELD OF THE INVENTION

The present invention relates generally to vehicle fuel system control techniques, and more specifically to techniques for controlling a fuel system in response to the load of the vehicle.

BACKGROUND OF THE INVENTION

Vehicles, especially large cargo-carrying vehicles, such as tractor-trailers and buses, operate in a variety of load conditions, ranging from fully loaded, to empty. The horsepower required for moving the vehicle will vary depending on the load conditions. The way a driver operates a vehicle can also impact the fuel economy. For example, by gradually transitioning from a stopped state to a cruising speed, less fuel may be consumed than by rapidly accelerating from a stopped state. However, many drivers feel the pressure of time constraints, and the desire to minimize time spent on a delivery route will often outweigh the desire to maximize fuel economy.

Due to increasing cost of fuel, it is therefore desirable to provide a system that maximizes fuel economy, with minimal dependence on the driving techniques or actions of the vehicle operator. It is also desirable to provide such a system that can interface with an existing electronic engine control module (ECM). Electronic control modules for managing the operation of internal combustion engines are well known and widely used in the automotive and tractor truck industries. Such modules are typically operable to control engine fueling as well as many other engine and/or vehicle operating conditions.

To the extent not inconsistent with the present disclosure, U.S. Pat. Nos. 5,477,827; 5,937,826; 6,135,918; and 6,412,789 are incorporated herein by reference.

SUMMARY OF INVENTION

The present invention provides a system and method for improving fuel economy in a vehicle equipped with an internal combustion engine. It is an advantage of the present invention to provide a system and method requiring minimal involvement on the part of the operator of the vehicle. Generally, the present invention provides control of the engine operation as a function of the weight of the cargo carried by the vehicle. A feature of the present invention is a method and apparatus for retrofitting existing vehicles with the system for improving fuel economy in a vehicle equipped with an internal combustion engine.

The present invention makes use of an existing engine control module to reduce the torque and/or horsepower of the engine if the vehicle is not fully loaded. In one embodiment, the vehicle load is ascertained by measuring pressure in the suspension air-spring automatic pneumatic control system of a vehicle so equipped. This embodiment uses a two-state or Boolean load signal. For example, if the vehicle is less than half-loaded, the load signal is asserted. The load signal is fed into the "horsepower-limiting" signal input of an engine control module (ECM), causing it to operate in a reduced horsepower mode. An ECM having this capability is present in a variety of available engine control modules, including the V-Mac III electronics system utilized in Mack trucks. Some ECM embodiments have a "torque limiting" signal which essentially serves the same purpose. For the remainder of this disclosure, the term "horsepower-limiting input" will be used to refer to any ECM input which, when activated via a signal, causes the engine to be operated in a fuel-economizing mode. In another embodiment, a varying load is detected, for example, as a percentage of the maximum load capacity, and fed to an input of the ECM. The ECM receives this signal at an input port, and adjusts the engine accordingly, by limiting engine operating parameters, which may include torque, horsepower, and/or engine speed. In this embodiment, multiple levels of horsepower reduction are possible. For example, in the case of a mass transit bus, as more people exit the bus, the ECM can gradually reduce engine horsepower, and therefore, reduce fuel consumption, while maintaining normal engine performance. Further details, and alternate embodiments will be presented in the detailed description below.

BRIEF DESCRIPTION OF THE DRAWINGS

In the accompanying drawings.

DETAILED DESCRIPTION

In the control of combustion engines, the conventional practice utilizes an electronic engine control module (ECM) having volatile and nonvolatile memory, input and output driver circuitry, and a processor capable of executing a stored instruction set, to control the various functions of the engine and its associated systems. A particular electronic control unit communicates with numerous sensors, actuators, and other electronic control units necessary to control various functions, which may include various aspects of fuel delivery. Various embodiments of an engine control module (ECM) are known in the art. For example, U.S. Pat. Nos. 5,477,827, 5,937,826, and 6,135,918, incorporated herein by reference, each disclose an engine control module adaptable for use in the present invention.

Figure 1:
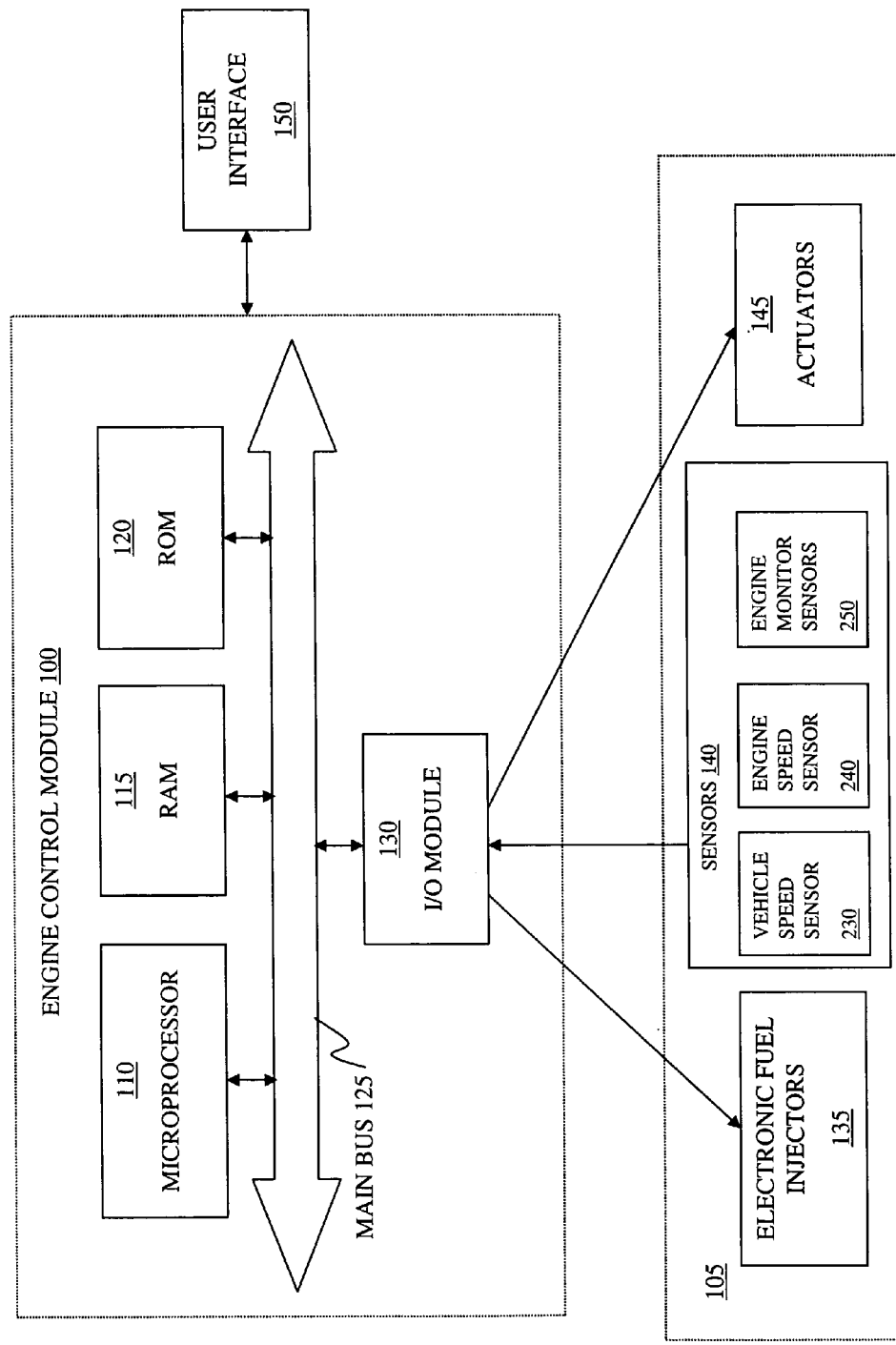
FIG. 1 is a diagram showing the relationship of the engine control module of the present invention with electronic fuel injectors, sensors, actuators in an internal combustion engine.

Referring now to FIG. 1, there is shown an engine control module (ECM) 100 in communication with a typical assemblage of engine components, indicated generally by reference numeral 105, and a user-interface 150. As shown, the ECM 100 includes a microprocessor 110 having random-access memory (RAM) 115, and nonvolatile read-only memory (ROM) 120. Of course, the ECM 100 may contain other types of memory instead of, or in addition to, RAM 115 and ROM 120, such as flash EPROM or EEPROM memories, as is well known in the art.

The ROM 120, or other nonvolatile memory, may contain instructions, which are executed to perform various control and information functions, as well as data tables, which contain calibration values and parameters characterizing normal engine operation. Microprocessor 110 imparts control signals to, and receives signals from, input and output (I/O) module 130. The I/O module 130 contains a plurality of analog and digital inputs and outputs. These inputs and outputs are in communication with the components within the engine assemblage 105. The ECM 100 detailed above is interconnected by data, address and control buses, indicated symbolically as the main bus 125. It should be noted that there are a variety of other possible control schemes which include various combinations of microprocessors and electric or electronic circuits which could perform the same function.

With continuing reference to FIG. 1, some of the components within engine assemblage 105 are shown. These include a plurality of electronic fuel injectors 135, each of which may be associated with a particular engine cylinder; and a plurality of sensors 140 for indicating various engine operating conditions. These sensors 140 include vehicle speed sensor 230, engine speed sensor 240, and a variety of engine monitoring sensors, which may include coolant temperature, air temperature, oil temperature, fuel temperature, throttle position, intake manifold pressure, fuel pressure, oil pressure, coolant pressure, cylinder position, and cylinder sequencing, to name a few. Engine assemblage 105 also includes actuators 145, which may include solenoids, variable valves, indicator lights, motors, and/or generators. It should be appreciated that the ECM 100 may also be in communication with other vehicle systems and microprocessors which control associated vehicle systems, such as the brakes, the transmission, a vehicle management system or a fleet management radio transponder.

The user-interface, or data-hub, 150 is used to store user selected parameters to monitor and values for those parameters, and determine service intervals and perform trend analyses. User selected parameters may include adjustable limits, such as desired engine oil life. Engine historical information may include diagnostic information, which is used to assist personnel performing routine maintenance, or troubleshooting malfunctions, as well as engine and vehicle operation data, which may be analyzed to evaluate vehicle operator performance in addition to vehicle performance. The ECM 100 executes software so as to control the various parameters of the engine.

Figure 2:
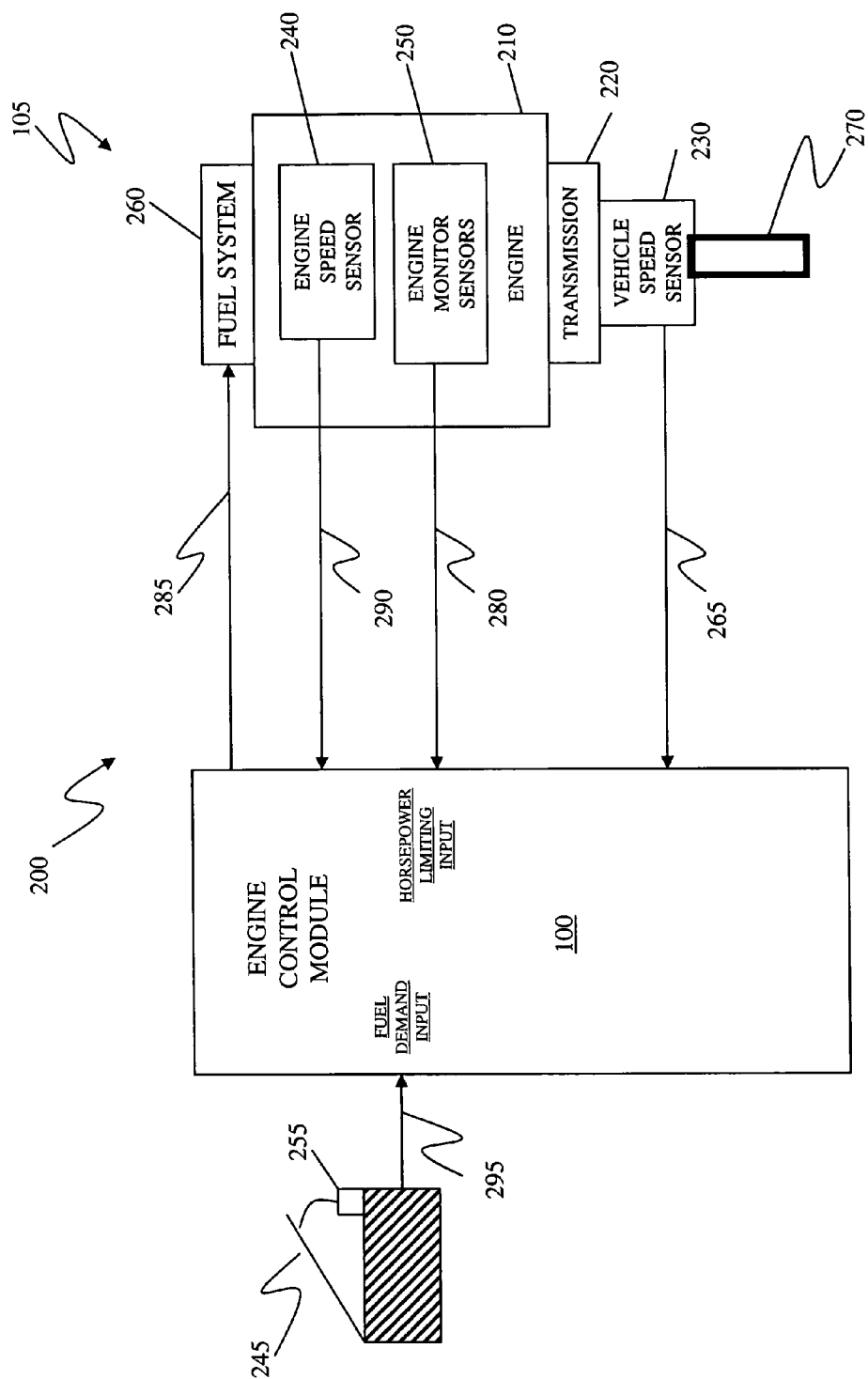
FIG. 2 is a diagram showing a prior art system 200 for controlling engine operation.

Referring now to FIG. 2, a system 200 for controlling engine operation is shown. Central to system 200 is ECM 100, which interfaces with various engine and/or vehicle components, shown as engine assemblage 105.

An internal combustion engine 210 is operatively connected to a main transmission 220 as is known in the art. A propeller shaft, or tailshaft, 270 extends from transmission 220, whereby transmission 220 is operable to rotatably actuate propeller shaft 270 and thereby provide driving power to one or more vehicle wheels via a drive axle (not shown) as is known in the art. System 200 may further include, particularly as is known in the heavy duty tractor truck art, one or more auxiliary transmissions and interconnecting propeller shafts (not shown), power take off (PTO) devices, and other known drivetrain components.

As mentioned previously, a number of sensors and actuators permit ECM 100 to interface with some of the various components of system 200 as well as other vehicle and/or engine systems. The sensors 140 include an engine speed sensor 240, which is electrically connected to an input of ECM 100 via signal path 290. Engine speed sensor 240 is preferably a known Hall-effect device operable to sense speed and/or position of a toothed gear rotating synchronously with the engine crankshaft. However, the present invention contemplates using any known engine speed sensor 240, such as a variable reluctance sensor or the like, which is operable to sense engine rotational speed and provide a signal to ECM 100 corresponding thereto.

A vehicle speed sensor 230 is preferably positioned about propeller shaft 270 adjacent to transmission 220, and is electrically connected in an input of ECM 100 via signal path 265. Vehicle speed sensor 230 is preferably a variable reluctance sensor operable to sense rotational speed of propeller shaft 270 and provide a vehicle speed signal ECM 100 corresponding thereto. While vehicle speed sensor 230 is shown in FIG. 2 as being located adjacent to transmission 220, it is to be understood that vehicle speed sensor 230 may alternatively be located anywhere along propeller shaft 270. Moreover, it is possible to use any other known vehicle speed sensor operable to provide ECM 100 with a vehicle speed signal indicative of vehicle road speed.

System 200 further includes a fuel system 260, which is electrically connected to an output of ECM 100 via signal path 285. Fueling system 260 is responsive to fueling signals (e.g. commanded fuel) provided by ECM 100 on signal path 285 to supply fuel to engine 210 as is known in the art.

An accelerator pedal 245 preferably includes an accelerator pedal position or deflection sensor 255 that is electrically connected to the "fuel demand" input of ECM 100 via fuel demand signal path 295. Deflection sensor 255 is, in one preferred embodiment, a potentiometer electrically connected to a suitable voltage and having a wiper that is electrically connected to signal path 295 and mechanically connected to pedal 245 so that the voltage on signal path 295 corresponds directly to the position, or deflection, of the accelerator pedal 245. The present invention further contemplates that other known sensors may be alternatively associated with accelerator pedal 245 to provide one or more analog and/or digital signals corresponding to accelerator pedal position or pressure applied to pedal 245. In any event, such a sensor is operable to provide ECM 100 with an accelerator pedal deflection signal representative of fuel demand. Hereinafter, the accelerator pedal deflection signal will be referred to generically as a fuel demand signal.

Figure 3:
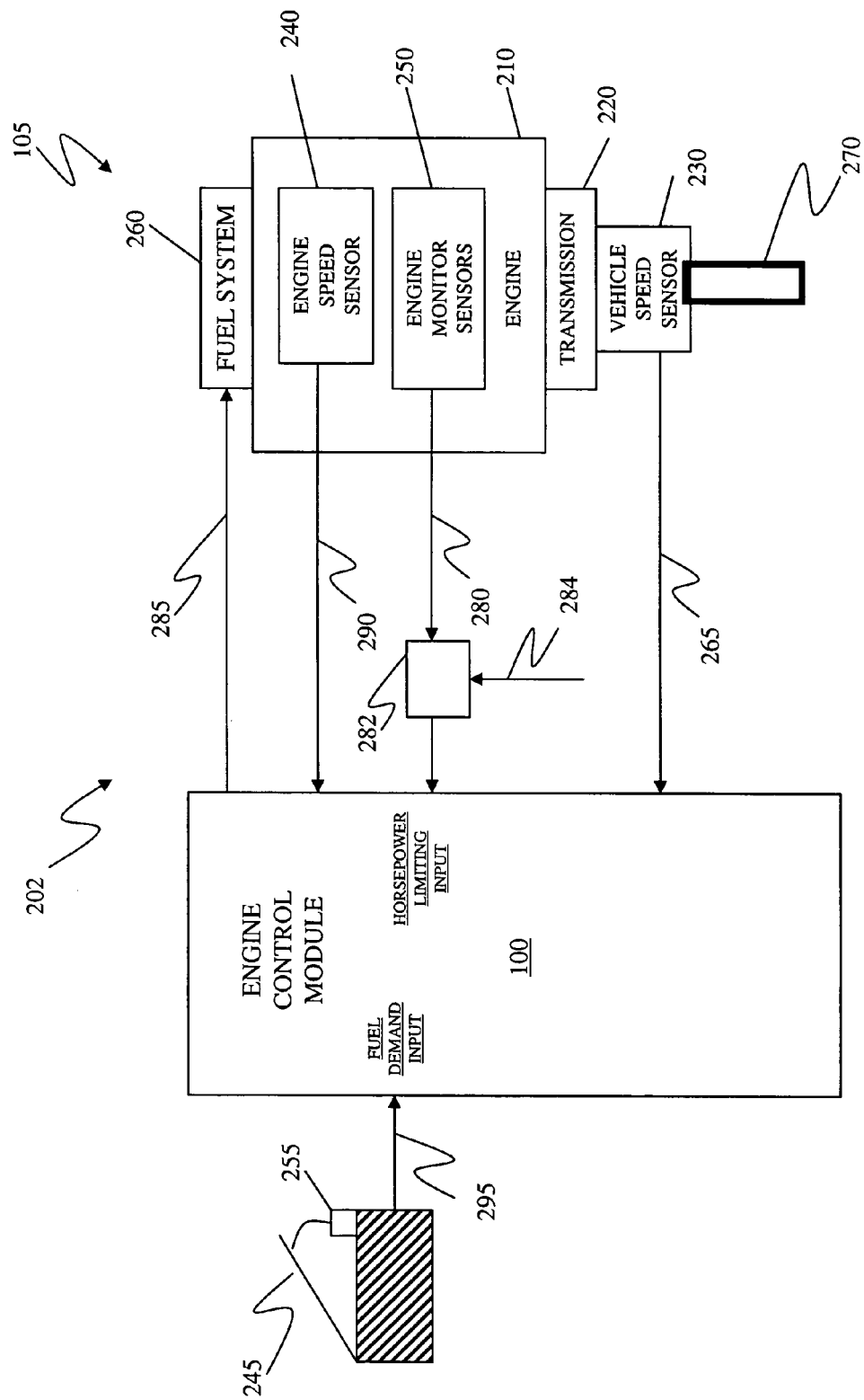
FIG. 3 is a diagram showing an embodiment 202 of the present invention.

FIG. 3 shows a system 202 for controlling engine operation in accordance with the present invention. This system includes logic circuit 282, which has two input sources. A first input source is the engine monitor sensor output from signal path 280. A second input source is from the load signal path 284. In one embodiment, the load signal is a two-state signal that is asserted when the vehicle is less than 50% loaded. Logic circuit 282 serves to perform a logical "OR" function. If either the engine monitor sensor output 280, or load signal 284 are asserted, the output signal path 286 of the logic circuit 282 will be asserted. Output signal path 282 is connected to the horsepower-limiting signal input of an engine control module (ECM), causing it to operate in a reduced horsepower mode.

Figure 4:
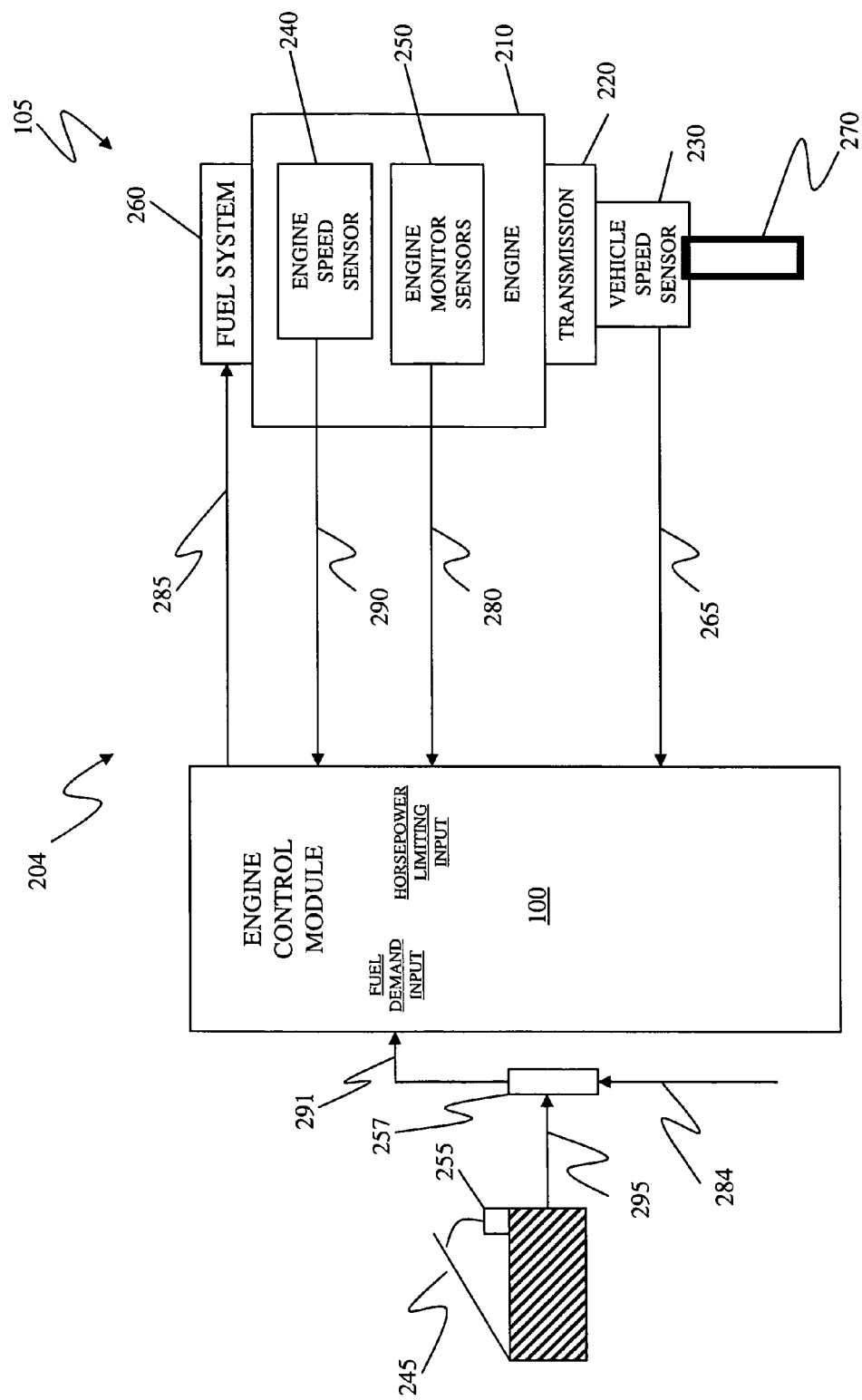
FIG. 4 is a diagram showing an embodiment 204 of the present invention.

FIG. 4 shows another embodiment of a system 204 for controlling engine operation in accordance with the present invention. This system includes attenuator circuit 257, which has two input sources. A first input source is the fuel demand signal 295. A second input source is from the load signal path 284. In one embodiment, the load signal is asserted when the vehicle is less than 50% loaded. When the load signal is not asserted, the attenuator circuit is deactivated, and the fuel demand signal is passed to the ECM 100 via signal path 291 without any alteration. When the load signal is asserted, the attenuator circuit is activated, which attenuates the fuel demand signal fed into the ECM via signal path 291. This has the effect of making it appear to the ECM that the driver has not depressed the accelerator as much, thereby reducing acceleration and saving fuel. Optionally, the output signal 291 of attenuator circuit 237 may be digitized before inputting it to ECM 100. It is preferable to apply a certain amount of hysteresis to the signal provided to the ECM 100. The hysteresis serves to delay attenuation of the fuel demand signal until the load signal is asserted continuously for a predetermined amount of time, thereby preventing rapid changes to and from the reduced horsepower mode of operation. The attenuator circuit 237 may optionally have a microcontroller to perform the hysteresis processing. For example, in one embodiment, only if the load signal was asserted for five seconds continuously, would the output signal 291 of attenuator circuit 237 be reduced to cause a reduced horsepower mode of operation.

Figure 5:
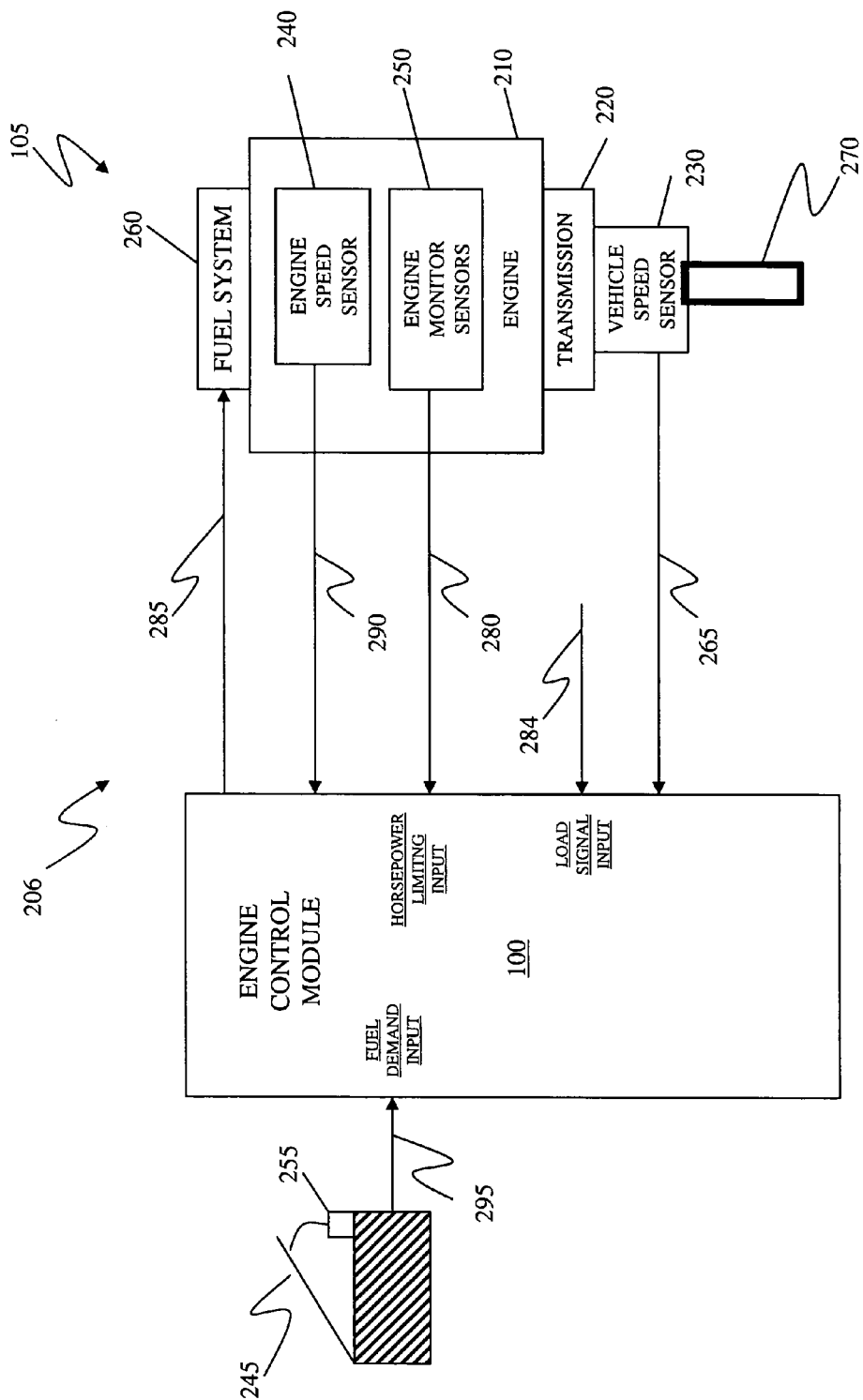
FIG. 5 is a diagram showing an embodiment 206 of the present invention.

FIG. 5 shows another embodiment of a system 206 for controlling engine operation in accordance with the present invention. This embodiment has an input source from the load signal path 284 connected to a dedicated load signal input of ECM 100. In this embodiment, the load signal is a varying signal that can represent various load conditions. The signal may be an analog signal. For example, the load signal may be voltage, which changes as a function of vehicle weight. This signal can then be converted to a digital signal to be interpreted by ECM 100. The load signal 284 may also be a digital signal. For example, the load signal may be a value ranging from 0 to 255, representing a loading condition of the vehicle, where 255 is fully loaded, 0 is empty, and values in between 0 and 255 represent various loading conditions between empty and full. Those skilled in the art will realize that other values and schemes can be used with out departing from the scope of the present invention. Software executing on ECM 100 receives the load signal 284 and adjusts torque and/or horsepower accordingly to optimize fuel efficiency. For example, if a truck is operating with an attached trailer that is empty, then less power is needed, and the engine torque can be reduced from the full engine capability. Assume the driver visits various locations to pick up packages. Gradually, the vehicle load increases, and the ECM 100 can gradually increase the available engine torque to accommodate the increased vehicle load.

As stated previously, in one embodiment, the vehicle load is ascertained by measuring deflection of the vehicle suspension. In particular, the present invention is well suited for use with tractor-trailers, also referred to as semi-trailers. The vehicle load can be ascertained by monitoring the air pressure at the proper point in a suspension air-spring automatic pneumatic control system commonly used on semi-trailers. Various embodiments of such systems are known in the art. For example, U.S. Pat. No. 6,412,789, incorporated herein by reference, discloses a semi-trailer suspension air-spring automatic pneumatic control system adaptable for use in the present invention.

Figure 6:
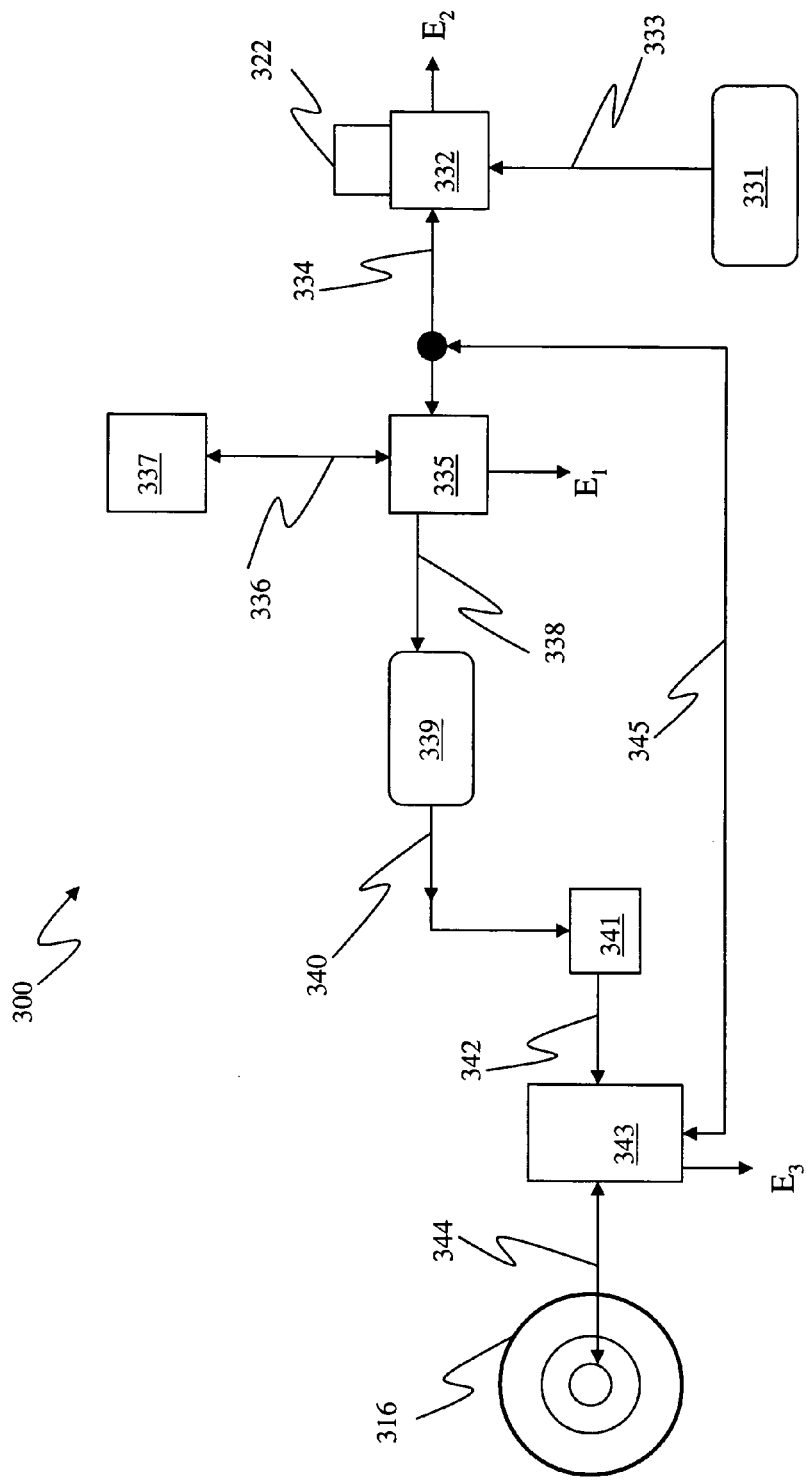
FIG. 6 is a diagram showing a prior art suspension air-spring automatic pneumatic control system 300.

A diagrammatic view of a suspension air-spring automatic pneumatic control system is indicated generally at 300 and is shown in FIG. 6. A reservoir of pressurized air for the tractor of the semi-trailer is indicated at 331, and as is well known to those skilled in the semi-trailer art, the supply of air in the tractor air reservoir, and in any other air reservoirs described herein below and used on the semi-trailer, is generated by a usual compressor (not shown). A compressor is necessary since during the course of operation of the vehicle, air is exhausted from pneumatic control system 300 and must be replenished. Tractor air reservoir 331 is pneumatically connected via a conduit 333 to a parking brake actuation valve 332, having an exhaust port as indicated by arrow $E_2$. Parking brake actuation valve 322 is located in the cab of the tractor (not shown) for easy access by the operator. It is understood that the directional arrows shown on each conduit such as conduit 333 indicate the possible direction or directions of airflow within the conduit during operation of pneumatic control system 300. Parking brake actuation valve 332 is actuated by a push/pull knob 322 which opens and closes, respectively, the valve 332, as will be described herein below in greater detail in the explanation of the operation of pneumatic control system 300. Valve 332 typically is a vented two-position two-way valve and is part of a control module specifically designed to operate the parking brakes of both the trailer and the tractor in conformance with federal regulations. An example of a suitable control module which incorporates valve 332 is the MV-2 Control Module made available by the Heavy Vehicle Systems Group of Bendix. A trailer supply line 334 pneumatically connects parking brake actuation valve 332 to a parking brake relay valve 335, which has an exhaust port as indicated by arrow $E_1$. A conduit 336 pneumatically connects parking brake relay valve 335 to the chamber (not shown) of a parking brake 337. Parking brake relay valve 335 also is pneumatically connected to trailer air reservoir 339 by a conduit 338. A conduit 340 in turn pneumatically connects trailer air reservoir 339 to a conventional height control valve 341 used to set the operational ride-height of the semi-trailer, or the height that the vehicle frame is maintained from the travel surface by the axle/suspension system. Height control valve 341 is pneumatically connected via a conduit 342 to an air-spring pilot valve 343 having an exhaust port as represented by arrow $E_3$. It is understood that pilot valve 343 is a two-position three-way valve which is spring-biased to the closed position. Pilot valve 343 is pneumatically connected to air-spring 316 via a conduit 344. A pressure sensor line 345 extends between and is pneumatically connected to supply line conduit 334 and pilot valve 343 to complete the components and arrangement of pneumatic control system 300.

It is to be understood that there may be some variation in the arrangement of the components of suspension air-spring automatic pneumatic control systems employed on various vehicles. In some cases, air from tractor air reservoir 331 is pneumatically connected via a conduit directly to height control valve 341. Alternatively, the path from tractor air reservoir 331 may be pneumatically connected indirectly to height control valve 341 in a manner other than depicted in FIG. 6. However, the present invention may be practiced on any suspension air-spring automatic pneumatic control system that utilizes a height control mechanism, such as height control valve 341.

The operation of the suspension air-spring automatic control system 300 now will be described. Upon disengagement of parking brake 337, air pressure is supplied to the other components of control system 300 by tractor reservoir 331, and passes all the way through the system to air-spring 316. More particularly, parking brake 337 is disengaged by the operator of the semi-trailer by pushing in knob 322 of parking brake actuation valve 332. Valve 332 opens enabling pressurized air to travel from tractor reservoir 331, through conduit 333, through open valve 332, through conduit 334, through parking brake relay valve 335, and through conduit 336 and into the chamber of parking brake 337. Parking brake 337 is spring biased to the set or engaged position, but the pressurized air passing through conduit 336 as described is sufficient to overcome the spring bias and release the parking brake and maintain it in a disengaged condition. Pressure sensor line 345 in turn also is pressurized by an amount corresponding to the level of air pressure in conduit 334, and the air pressure overcomes the spring bias of pilot valve 343 to the closed position. Pilot valve 343 thus opens enabling pressurized air to travel from conduit 338 through trailer air reservoir 339, conduit 340, height control valve 341, conduit 342, open pilot valve 343, conduit 344, and into air-spring 316, to inflate the air-spring and raise the semi-trailer frame (not shown) to a suitable ride-height condition as predetermined by the height control valve. If the vehicle load is reduced, for example, by unloading cargo at a delivery stop, the height control valve 341 will cause a reduction in pressure in air-spring 316, allowing the ride-height to be maintained. Conversely, if at a delivery stop, more cargo is loaded onto the vehicle, increasing the load, the height control valve 341 will cause an increase in pressure in air-spring 316 to allow the vehicle ride-height to be maintained given the increased load conditions.

Figure 7:
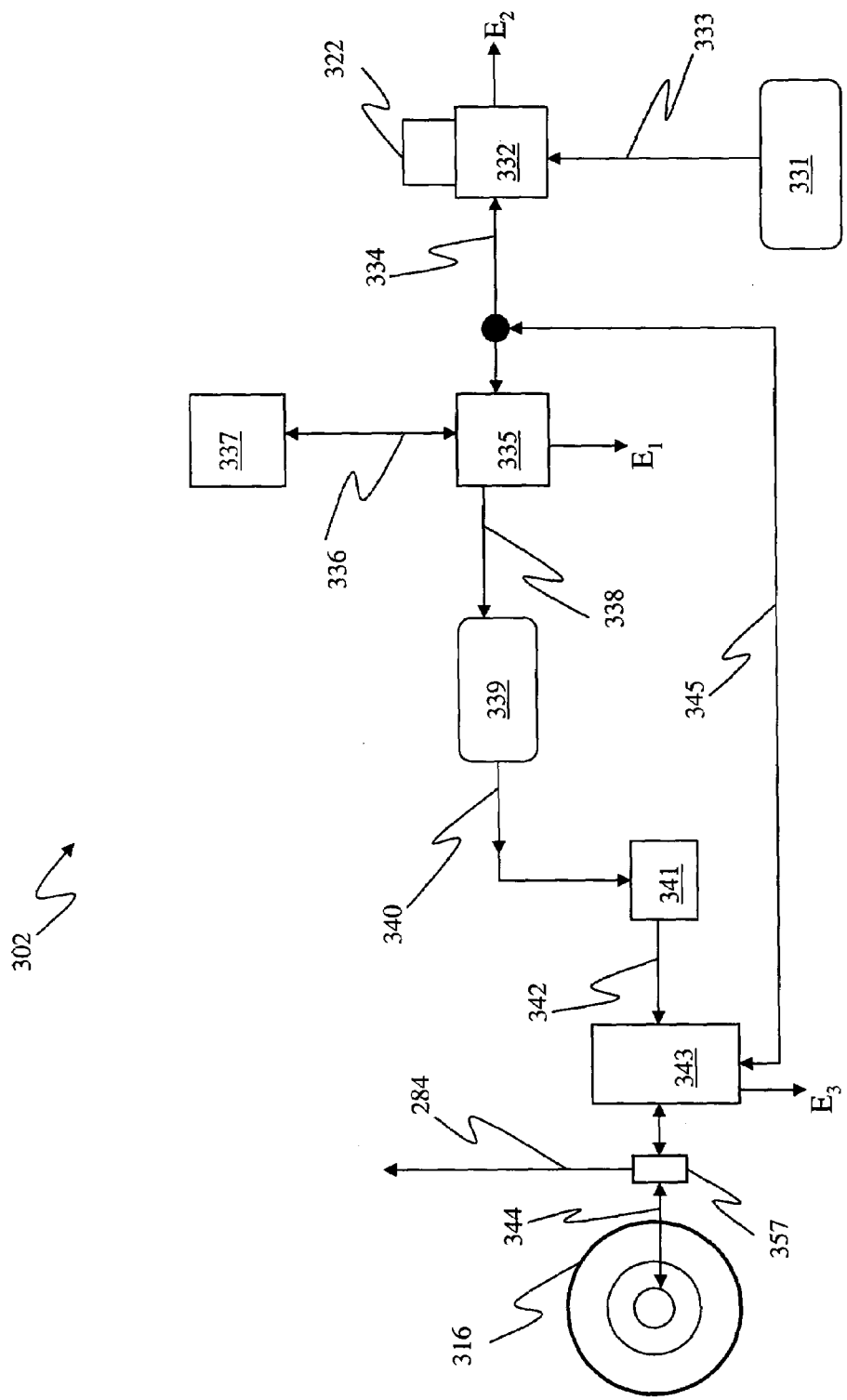
FIG. 7 is a diagram showing embodiment 302 of the present invention.

FIG. 7 shows a suspension air-spring automatic pneumatic control system 302 in accordance with the present invention. This system includes a pressure sensor 357 that monitors the pressure in the air-spring 316. In one embodiment, pressure sensor 357 may be a Bendix #276599 model LP-3 Low Pressure Indicator. This pressure sensor generates load signal 284, which is input to a system for controlling engine operation in accordance with the present invention.

The method of using the present invention to retrofit an existing vehicle will now be explained. The load signal is generated, preferably by installing a pressure sensor in the suspension air-spring automatic pneumatic control system of a vehicle so equipped, such that the pressure sensor monitors pressure in the air-spring 316 and generates load signal 284. In one embodiment, the load signal 284 is connected to the horsepower-limiting input of ECM 100. Alternatively, the load signal 284 may be fed to attenuator circuit 257. The attenuator circuit 257 attenuates the fuel demand signal 295 and provides attenuated fuel demand signal to the ECM 100 via signal path 291. This embodiment can be used to retrofit vehicles in the case where the ECM of the vehicle does not provide a horsepower-limiting input. As long as the ECM provides a fuel demand input, this embodiment can provide reduced fuel consumption by attenuating the fuel demand signal during conditions when a vehicle is not fully loaded.

Although the description above contains various specific details, these should not be construed as limiting the scope of the invention, but merely providing some of the presently preferred embodiments of this invention. For example load signal 284 may be transmitted to a system for controlling engine operation using a variety of methods. In one embodiment, cabling between the suspension air-spring automatic pneumatic control system and the ECM 100 used in any of the systems for controlling engine operation disclosed previously. The analog signal from pressure sensor 357 may be amplified and/or converted into a digital signal before feeding it to ECM 100. It is also contemplated that a radio frequency data link may be used to transmit load values from the suspension air-spring automatic pneumatic control system to the ECM 100 with out the need for a direct wired connection between them.

Alternatively, it is possible to use other means for determining the vehicle load. For example, a strain gauge module, comprising one or more strain gauges mounted at various stress points on a vehicle chassis can generate analog signals, which are a function of vehicle load. These signals can be averaged or otherwise combined to serve as the load signal 284, which is then fed to ECM 100. Alternatively, a mechanical deflection mechanism such as a scale may be used to generate the load signal. Those skilled in the art will recognize that any load detection method capable of generating a load signal may be used as part of the implementation of the present invention.

Thus, the scope of the invention should be determined by the appended claims and their legal equivalents, rather than by the examples given.

What is claimed is:

1. A method for improving fuel economy in a vehicle including a suspension air-spring automatic pneumatic control system, and an internal combustion engine controlled by an electronic engine control module, the engine having a plurality of cylinders, each cylinder having an associated fuel injector for dispensing fuel to the cylinder, comprising:
    measuring the vehicle load;
    generating a load signal;
    providing said load signal to horsepower-limiting input of said electronic engine control module;
    whereby said electronic engine control module modifies the fuel dispensed to the fuel injectors based on the signal provided to the horsepower-limiting input of said electronic engine control module so as to reduce fuel consumption during operation of the vehicle.

2. A method for improving fuel economy in a vehicle including a suspension air-spring automatic pneumatic control system, and an internal combustion engine controlled by an electronic engine control module, the engine having a plurality of cylinders, each cylinder having an associated fuel injector for dispensing fuel to the cylinder, the electronic engine control module having a fuel demand signal input, comprising:
    measuring the vehicle load;
    generating a load signal;
    attenuating the fuel demand signal input to said electronic engine control module as a function of said load signal;
    whereby said electronic engine control module modifies the fuel dispensed to the fuel injectors based on the attenuated signal provided to the fuel demand input of said electronic engine control module so as to reduce fuel consumption during operation of the vehicle.

3. A system for improving fuel economy in a vehicle including a suspension air-spring automatic pneumatic control system, and an internal combustion engine controlled by an electronic engine control module, the engine having a plurality of cylinders, each cylinder having an associated fuel injector for dispensing fuel to the cylinder, comprising:
    means for measuring the vehicle load;
    means for generating a load signal;
    means for providing said load signal to horsepower-limiting input of said electronic engine control module;
    whereby said electronic engine control module modifies the fuel dispensed to the fuel injectors based on the signal provided to the horsepower-limiting input of said electronic engine control module so as to reduce fuel consumption during operation of the vehicle.

4. A system for improving fuel economy in a vehicle including a suspension air-spring automatic pneumatic control system, and an internal combustion engine controlled by an electronic engine control module, the engine having a plurality of cylinders, each cylinder having an associated fuel injector for dispensing fuel to the cylinder, the electronic engine control module having a fuel demand signal input, comprising:
    means for measuring the vehicle load;
    means for generating a load signal;
    means for attenuating the fuel demand signal input to said electronic engine control module as a function of said load signal;

whereby said electronic engine control module modifies the fuel dispensed to the fuel injectors based on the attenuated signal provided to the fuel demand input of said electronic engine control module so as to reduce fuel consumption during operation of the vehicle.

5. The system of claim 3, wherein the means for measuring the vehicle load is a pressure sensor that monitors the pressure in an air-spring of the suspension air-spring automatic pneumatic control system of the vehicle, said pressure sensor generating a load signal when the pressure drops below a predetermined level.

6. The system of claim 3, wherein the means for measuring the vehicle load is a pressure sensor that monitors the pressure in an air-spring of the suspension air-spring automatic pneumatic control system of the vehicle, said pressure sensor generating a load signal varying as a function of the pressure in an air-spring.

7. The method of claim 2, further comprising the step of delaying attenuation of the fuel demand signal input until the load signal is asserted for a predetermined amount of time.

8. The system of claim 4, further comprising a delaying means to delay attenuation of the fuel demand signal input until the load signal is asserted for a predetermined amount of time.

9. The system of claim 3, wherein the load signal generated by the means for generating a load signal is a two-state signal.

10. The system of claim 3, wherein the load signal generated by the means for generating a load signal is a continuously varying analog signal.

11. The system of claim 3, wherein the load signal generated by the means for generating a load signal is a digital signal representing a plurality of load conditions.

12. The system of claim 4, wherein the load signal generated by the means for generating a load signal is a two-state signal.

13. The system of claim 4, wherein the load signal generated by the means for generating a load signal is a continuously varying analog signal.

14. The system of claim 4, wherein the load signal generated by the means for generating a load signal is a digital signal representing a plurality of load conditions.

* * * * *